Figure 1:
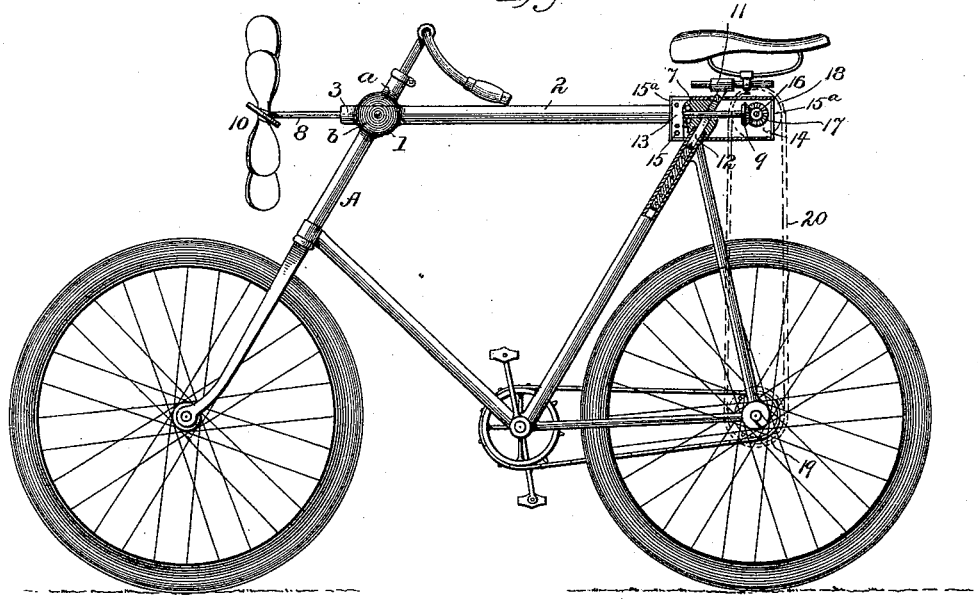

(No Model.)

E. P. HART.
BICYCLE PROPULSION.

No. 583,533. Patented June 1, 1897.

Witnesses
John Enders Jr.
K. A. Nau

Inventor
Edward P. Hart
By John Wedderburn
his Attorney.

UNITED STATES PATENT OFFICE.

EDWARD P. HART, OF ROCHESTER, NEW YORK.

BICYCLE PROPULSION.

SPECIFICATION forming part of Letters Patent No. 583,533, dated June 1, 1897.

Application filed May 14, 1896. Serial No. 591,551. (No model.)

*To all whom it may concern:*

Be it known that I, EDWARD P. HART, a citizen of the United States, residing at Rochester, in the county of Monroe and State of New York, have invented certain new and useful Improvements in Bicycle Propulsion; and I do hereby declare the following to be a full, clear, and exact description of the invention, such as will enable others skilled in the art to which it appertains to make and use the same.

My invention relates to bicycle propulsion.

My object is to provide improved, simple, and efficient mechanism adapted to be actuated by the force of the wind to propel a bicycle.

The invention consists in the construction, combinations, and arrangement of parts, all as more fully hereinafter described, shown in the drawings, and then particularly pointed out in the appended claims.

Figure 2:
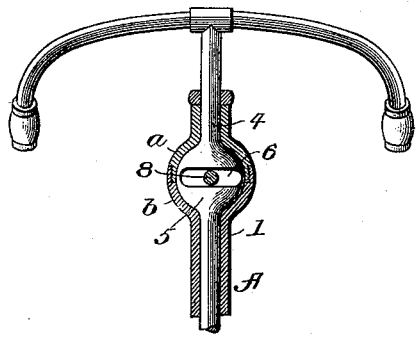

In the accompanying drawings, Figure 1 represents a side elevation of an ordinary bicycle equipped with my improvements, parts being broken away to disclose the construction; and Fig. 2, a front elevation showing the steering-tube in section and the steering head or bar in full lines.

The steering-tube A of the bicycle is provided with a globular enlargement 1 where the cross-tube 2 of the frame joins the same. The enlargement is for convenience formed in two screw-threaded detachable sections $a$ and $b$. From the globular enlargement projects a ball-bearing box 3 in alinement with the cross-tube 2. The steering-head 4 is also provided with a globular enlargement 5, which is transversely slotted at 6. A globe-joint is thus provided, allowing the steering-head to turn freely within the tube A. The rear end of the cross-tube 2 is provided with a ball-bearing box 7, as shown. A drive-shaft 8 is incased in the cross-tube 2 and works easily in the aforesaid ball-bearings and carries a bevel-gear 9 on its rear end. The fore end of the shaft carries a wind-wheel 10, which is adapted to catch the wind when it is blowing toward the front of the bicycle. The aforesaid shaft passes through the transverse slot in the globular enlargement of the steering-head, so that the front wheel of the bicycle can be turned as desired. The bicycle-saddle support 11 is provided with an elongated slot 12, through which the drive-shaft 8 passes, so that the saddle may be adjusted up and down, as desired. The bevel-gear on the rear end of the drive-shaft is inclosed in a box-like structure formed of metal side plates 13 and 14, and which are held together and to the bicycle-frame by bolts 15 and end plates 15$^a$. The side plates afford bearings for a short transverse shaft 16, which carries a bevel-gear 17, meshing with the bevel-gear on the end of the drive-shaft. It also carries a sprocket 18.

The drive-wheel of the bicycle is provided with an extra sprocket 19, which is operatively connected to the sprocket 19 by a sprocket-chain 20.

When there is sufficient wind blowing to properly actuate the wind-wheel, the same will materially aid the rider in the propulsion of the vehicle, as the rotation of the wind-wheel transmits motion through the medium of the drive-shaft and bevel-gears to the sprockets 18 and 19 and sprocket-chain 20 and turns the drive-wheel of the machine. When the rider desires to again use the pedals, the wind-wheel may be removed, although it is not absolutely necessary to do so.

High rates of speed may be attained when a good wind is blowing, as the wind-wheel rotates quite rapidly. It is obvious that the gearing can be changed so that any practical rate of speed could be attained. The wind-wheel serves to break the force of the air as the machine moves forward and thus protects the rider.

While in the previous description reference has been made to the wind blowing, it will be understood, of course, that it is not necessary for the wind to be blowing in order for the bicycle to be ridden, it being understood, of course, that when the person is moving on the wheel the wind or air strikes him with the same force as it would if he were standing and the wind blowing at the rate at which he was moving, so when riding the bicycle the rider always has the wind blowing upon him, and say, for instance, he were riding at the rate of ten miles an hour, he would have the wind at the same rate to move the wind-wheel. By this arrangement a person can ride a much higher geared machine with the same force as ordinarily required in the usual geared wheel, it being understood that the faster the person rides the more wind he gets and the faster the wind-wheel will be operated.

Having thus described the invention, what is claimed as new is—

1. In a bicycle having the usual cross-tube, the combination with the bicycle drive-wheel, of a rotary shaft located in said cross-tube and passing through the steering-head of the bicycle, which latter is enlarged and slotted, a wind-wheel carried by the rotary shaft, and mechanism operatively connecting said rotary shaft with the bicycle drive-wheel, substantially as described.

2. In a bicycle, the combination with the bicycle-wheel, of a steering-tube having an enlargement, a steering-head also provided with an enlargement operating in the enlargement of the steering-tube and being transversely slotted, a rotary shaft passing through the steering-tube and slot in the steering-head, a wind-wheel carried by said shaft and mechanism operatively connecting said drive-shaft with the drive-wheel, substantially as described.

In testimony whereof I have signed this specification in the presence of two subscribing witnesses.

EDWARD P. HART.

Witnesses:
  B. M. ALLAN,
  JOS. J. MANDERY.